US006478124B2

(12) United States Patent
Cholinski

(10) Patent No.: US 6,478,124 B2
(45) Date of Patent: Nov. 12, 2002

(54) BRAKE DEVICE FOR A DRIVE MACHINE OF AN ELEVATOR

(75) Inventor: Andrzej Cholinski, Ebikon (CH)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 09/850,119

(22) Filed: May 7, 2001

(65) Prior Publication Data

US 2001/0042662 A1 Nov. 22, 2001

(30) Foreign Application Priority Data

May 19, 2000 (EP) ............................................ 00810441

(51) Int. Cl.[7] .................................................. B60L 7/00
(52) U.S. Cl. .................. 188/171; 188/158; 188/1.11 E
(58) Field of Search ................................ 188/171, 173, 188/1.11 R, 1.11 E, 74, 75, 76, 158–165, 216, 162; 116/208; 192/30 W; 340/454; 200/61.4, 61.44; 187/288, 350, 261, 351

(56) References Cited

U.S. PATENT DOCUMENTS 960,055 A * 5/1910 Sundh ........................ 188/171
1,860,394 A * 5/1932 Ohler ......................... 188/171
2,693,866 A * 11/1954 Trombetta .................. 188/171
4,023,655 A 5/1977 Anzai et al.
4,132,292 A * 1/1979 Dufresne .................... 188/171
5,899,304 A 5/1999 Daugherty

FOREIGN PATENT DOCUMENTS

| | | |
|---|---|---|
| DE | 297 16 352 | 2/1998 |
| EP | 0 603 644 | 6/1994 |
| FR | 2 308 832 | 11/1976 |
| FR | 2 387 898 | 11/1978 |

* cited by examiner

*Primary Examiner*—Douglas C. Butler
(74) *Attorney, Agent, or Firm*—MacMillan, Sobanski & Todd, LLC

(57) ABSTRACT

A brake device has magnets arranged on a frame that is fastened to a bearing pedestal of an elevator drive machine. The frame includes a pair of spaced stabilizers attached to a pair of magnet carriers on which the magnets are fastened. The magnets act on disk armatures arranged on brake arms pivoted on the pedestal. The magnetic forces act in opposition to the spring forces of compression springs and release the brake shoes from a brake drum, the forces which then occur being absorbed by the frame.

7 Claims, 2 Drawing Sheets

BRAKE DEVICE FOR A DRIVE MACHINE OF AN ELEVATOR

BACKGROUND OF THE INVENTION

The present invention relates to a brake device for a drive machine of an elevator, comprising brake arms which are supported in swiveling manner on a bearing pedestal and have brake shoes which act on a brake drum, the brake arms being guided at their free ends by means of a fixed guide element and pressed against by compression springs acting in the direction of the guide element, magnets being provided which act in opposition to the compression springs to release the brake shoes.

European patent specification EP 0 603 644 shows a known brake device having a brake drum that is fastened to a traction sheave and against which brake shoes held in swiveling manner on brake arms rest. The brake arms are arranged at one end to pivot on axles. At the other end, a tie rod is provided which passes through the brake arms, and a compression spring is arranged at each end of the tie rod. The compression spring presses at one end against an end stop of the tie rod, and at the other end against the brake arm. The end stop can be moved by means of an adjusting screw, causing the brake shoe to be pressed to a greater or lesser degree against the brake drum. An actuating bolt passes through the free end of each brake arm. Both actuating bolts are acted on by a force originating in each case from a magnet, and acting in opposition to the spring force of the compression springs, so that the brake shoes are raised from the brake drum.

A disadvantage of this known brake device is that with brake devices for larger drive machines, the transmission of large braking forces onto the brake drum is not possible without additional measures, for reasons of material deformation. Furthermore, monitoring the position of the brake shoes requires a substantial capital outlay.

SUMMARY OF THE INVENTION

The present invention concerns a brake device that provides a solution to avoiding the disadvantages of the known brake devices and creates a brake device with which larger drive units can be reliably braked.

The advantages achieved by the invention are that with a simple construction of the brake device, and of the bearing pedestal supporting the brake device, a rigid brake device can be made with which, especially, greater braking forces can be transmitted onto the brake drum without problem. Furthermore, the stability of form, and the function, of the brake release system can be improved at the same time as the material outlay and weight are reduced. With the brake device according to the present invention, the accuracy of the instant at which the brake is released can be improved, which again has a positive effect on the ride comfort of the elevator car. Arranging the sensors to monitor the brake arms, and wiring the brake magnets, is possible without great capital outlay.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
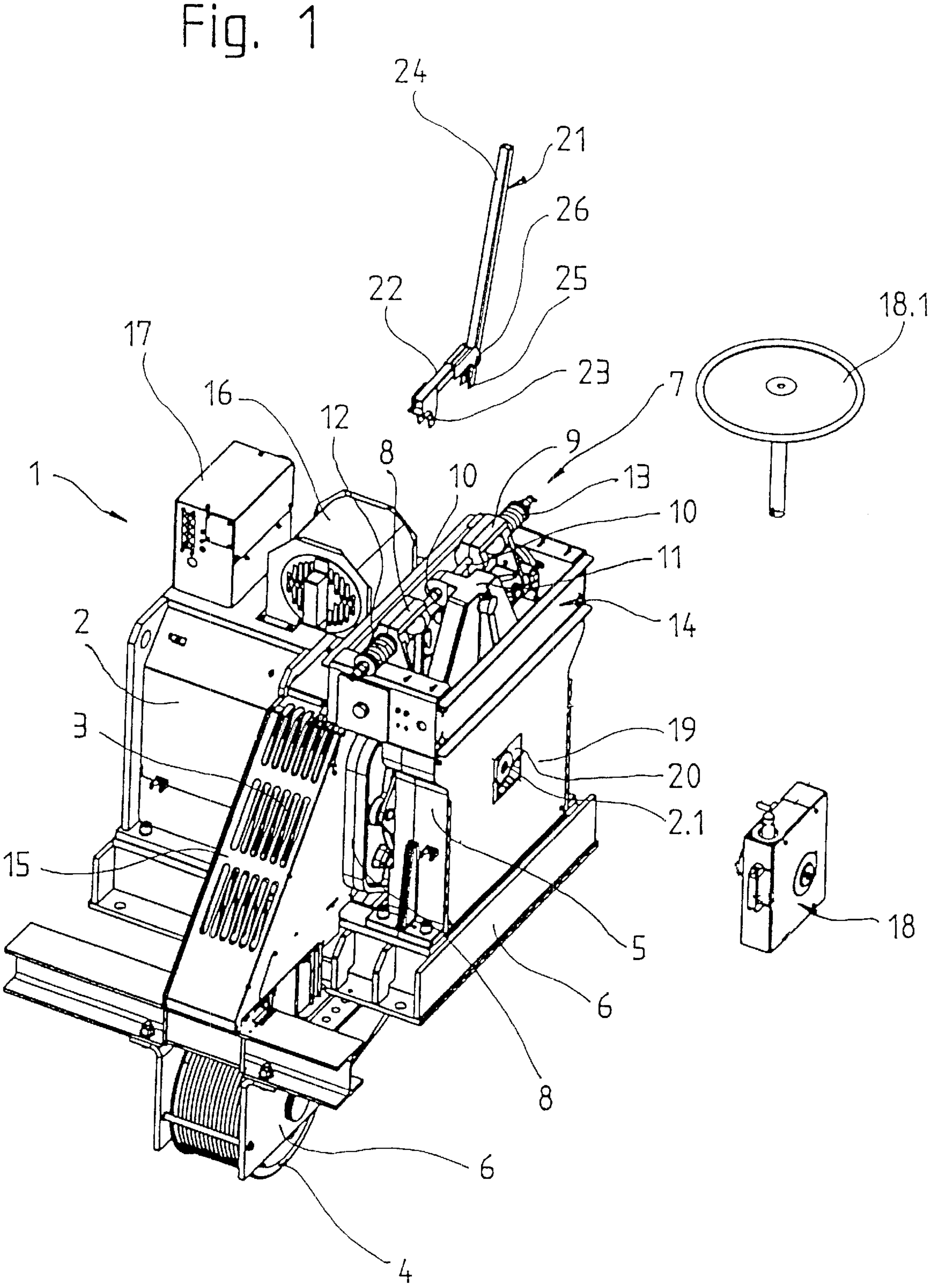
FIG. 1 is a perspective view a drive machine with a brake device in accordance with the present invention.

FIG. 1 shows a gearless drive machine 1 with a motor 2 that has of a stator (not shown) and a rotor (not shown), and drives a traction sheave 3. Guided over the traction sheave 3 and a return pulley 4 are ropes (not shown) that support and drive an elevator car (not shown) and a counterweight (not shown). The traction sheave 3 is held on a motor shaft 2.1 that at one end is supported in a bearing endplate (not shown) and at the other end in a bearing pedestal 5. The motor 2, the endplate, the bearing pedestal 5, and the return pulley 4 are supported by a machine support structure 6.

The drive machine 1 further includes a brake device 7 with a first brake arm 8 and a second brake arm 9, on each of which is arranged a brake shoe which acts on a brake drum (not shown). The brake drum takes the form of, for example, a collar of the traction sheave 3. The brake arms 8 and 9 are held below in pivoting manner on the bearing pedestal 5, and above they are guided on a rod 10. The rod 10, which serves as a guide element, is arranged centrally on a support 11 fastened to the bearing pedestal 5. To actuate the brake shoes, a compression spring 12 and 13 is provided on each brake arm 8 and 9. To release the brake shoes, each brake arm 8 and 9 is provided with a magnet which acts in opposition to the compression spring. The magnets are arranged on a frame 14 that is fastened to the bearing pedestal 5.

A guard 15 covers the ropes between the traction sheave 3 and the return pulley 4. A further guard (not shown) behind the drive machine 1 covers the ropes between the traction sheave 3 and the machine support structure 6. To cool the drive unit 1, a ventilating fan 16 is provided. A terminal box 17 serves as interface for power supply cables and as interface for control wiring.

For emergency operation of the elevator a removable hand drive 18 is provided, which can be connected to the motor shaft 2.1 without tools. A cover plate 19 of the bearing pedestal 5 has an opening 20 through which the hand drive 18 can be connected to the motor drive 2.1. The hand drive 18 can be driven by means of a removable handwheel 18.1. In an emergency, the elevator car is moved manually, in either an upward or downward direction depending on the load, to the next stop and the passengers evacuated. By actuating the handwheel 18.1, and simultaneously releasing the brake shoes by means of a removable brake release lever 21, the motor shaft 2.1 is moved manually, thereby lowering or raising the elevator car. The brake release lever 21 has a yoke 22 with a first claw 23 and a handle 24 with a second claw 25, the yoke being fastened by a swiveling joint 26 to the handle 24. To release the brake shoes, or specifically the brake arms 8 and 9, the brake release lever 21 is placed on the rod 10 and the handle 24 moved forward, as a result of which a force opposed to the spring force of the compression springs 12 and 13 acts by means of the claws 23 and 25 on the brake arms 8 and 9 and releases the brake shoes.

Figure 2:
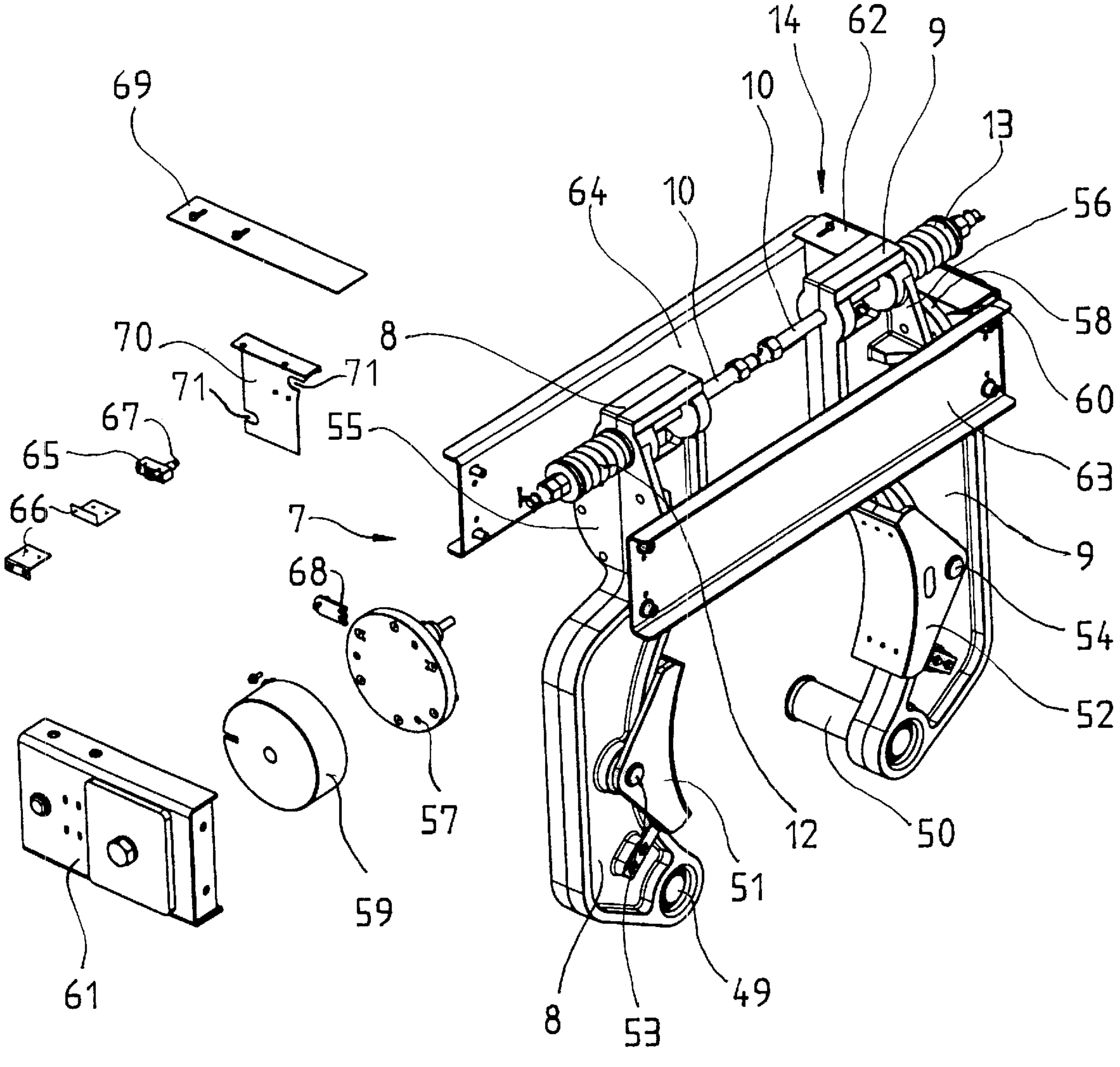
FIG. 2 is an exploded perspective view of the brake device shown in FIG. 1.

FIG. 2 shows the construction of the brake device 7. The brake arms 8 and 9 are arranged at one end to pivot on lever axles 49 and 50, the lever axles being fastened to the bearing pedestal 5. Arranged on each brake arm 8 and 9 to, pivot on a shoe axle 53 and 54 is a brake shoe 51 and 52 which acts on the brake drum. Each brake arm 8 and 9 is guided at its other end by means of the rod 10 which is fastened to the holder 11 of the bearing pedestal 5. The compression springs

12 and 13, which act in the direction of the axis of the rod 10, press the rod ends of the arms in the direction of the holder 11, causing the brake shoes 51 and 52 to brake the brake drum and/or hold it fast. At the guided end, each brake arm 8 and 9 has a wider part 55 and 56 which serves as a bearing surface for a disk armature 57 and 58. The disk armature 57 and 58 is pulled by the magnetic force of an electromagnet 59 and 60 against the spring force of the compression spring 12 and 13, causing the brake shoe 51 and 52 to be raised from the brake drum, and the brake to be released. The electromagnet 59 and 60 is arranged on a magnet carrier 61 and 62. Together with stabilizers 63 and 64, the magnet carriers 61 and 62 form the frame 14, the magnet carriers 61 and 62 being immovably fastened on their underside to the bearing pedestal 5. The rigid frame 14 absorbs the forces which arise when the brake is released. Arranged on the inner side of each magnet carrier 61 and 62 with fastening angles 66 is a microswitch 65. A plunger 67 of the microswitch 65 is actuated by a cam 68 arranged on the disk armature 57. The switching status of the microswitch 65 indicates to the control of the elevator whether the brake is activated or released. Instead of the microswitch 65, other sensors, for example proximity switches, can be used. The inner side of the magnet carrier 61 and 62 is covered by means of a cover 70 fastened to the magnet carrier 61 and 62 with a fastening plate 69, there being provided on the cover 70, which serves as a guard, recesses 71 for the plunger 67 of the microswitch 65 and for electric wires.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A brake device for a drive machine of an elevator, the drive machine having a brake drum comprising;

a pair of brake arms pivotally supported on a bearing pedestal and each having a brake shoe adapted to act on a brake drum of an elevator drive machine;

a fixed guide means guiding movement of a free end of each of said brake arms;

a pair of compression springs each acting on an associated one of said brake arms along said guide means to pivot said brake shoes into engagement with the brake drum; and a pair of magnets each mounted on a frame supported by said bearing pedestal, said frame being generally rectangular in shape and extending about an upper end of said pedestal, and said magnets being selectively actuable to act in opposition to an associated one of said compression springs to pivot said brake shoes out of engagement with the brake drum.

2. The brake device according to claim 1 wherein said frame includes a pair of magnet carriers each mounting an associated one of said magnets and extending between a pair of spaced apart stabilizers.

3. A brake device for a drive machine of an elevator, the drive machine having a brake drum, comprising:

a pair of brake arms pivotally supported on a bearing pedestal and each having a brake shoe adapted to act on a brake drum of an elevator drive machine;

a fixed guide means guiding movement of a free end of each of said brake arms;

a pair of compression springs each acting on an associated one of said brake arms along said guide means to pivot said brake shoes into engagement with the brake drum;

a pair of magnets each mounted on a frame supported by said bcaring pedestal, said magnets being selectively actuable to act in opposition to an associated one of said compression springs to pivot said brake shoes out of engagement with the brake drum; and a pair of disk armatures each attached to an associated one of said brake arms and cooperating with an associated one of said magnets.

4. The brake device according to claim 3 including a pair of switches for monitoring a status of the brake device mounted on said frame, each of said switches being actuated by an associated cam on an associated one of said disk armatures.

5. A brake device for a drive machine of an elevator, the drive machine having a brake drum, comprising:

a pair of brake arms pivotally supported on a bearing pedestal and each having a brake shoe adapted to act on a brake drum of an elevator drive machine;

a fixed rod guiding movement of a free end of each of said brake arms;

a pair of compression springs each acting on an associated one of said brake arms along said rod to pivot said brake shoes into engagement with the brake drum;

a pair of magnets each mounted on a frame supported by said bearing pedestal, said magnets being selectively actuable to act in opposition to an associated one of said compression springs to pivot said brake shoes out of engagement with the brake drum; and a pair of disk armatures each attached to an associated one of said brake arms and cooperating with an associated one of said magnets.

6. The brake device according to claim 5 wherein said frame includes a pair of magnet carriers each mounting an associated one of said magnets and extending between a pair of spaced apart stabilizers.

7. The brake device according to claim 5 including a pair of switches for monitoring a status of the brake device mounted on said frame, each of said switches being actuated by an associated cam on an associated one of said disk armatures.

* * * * *